UNITED STATES PATENT OFFICE.

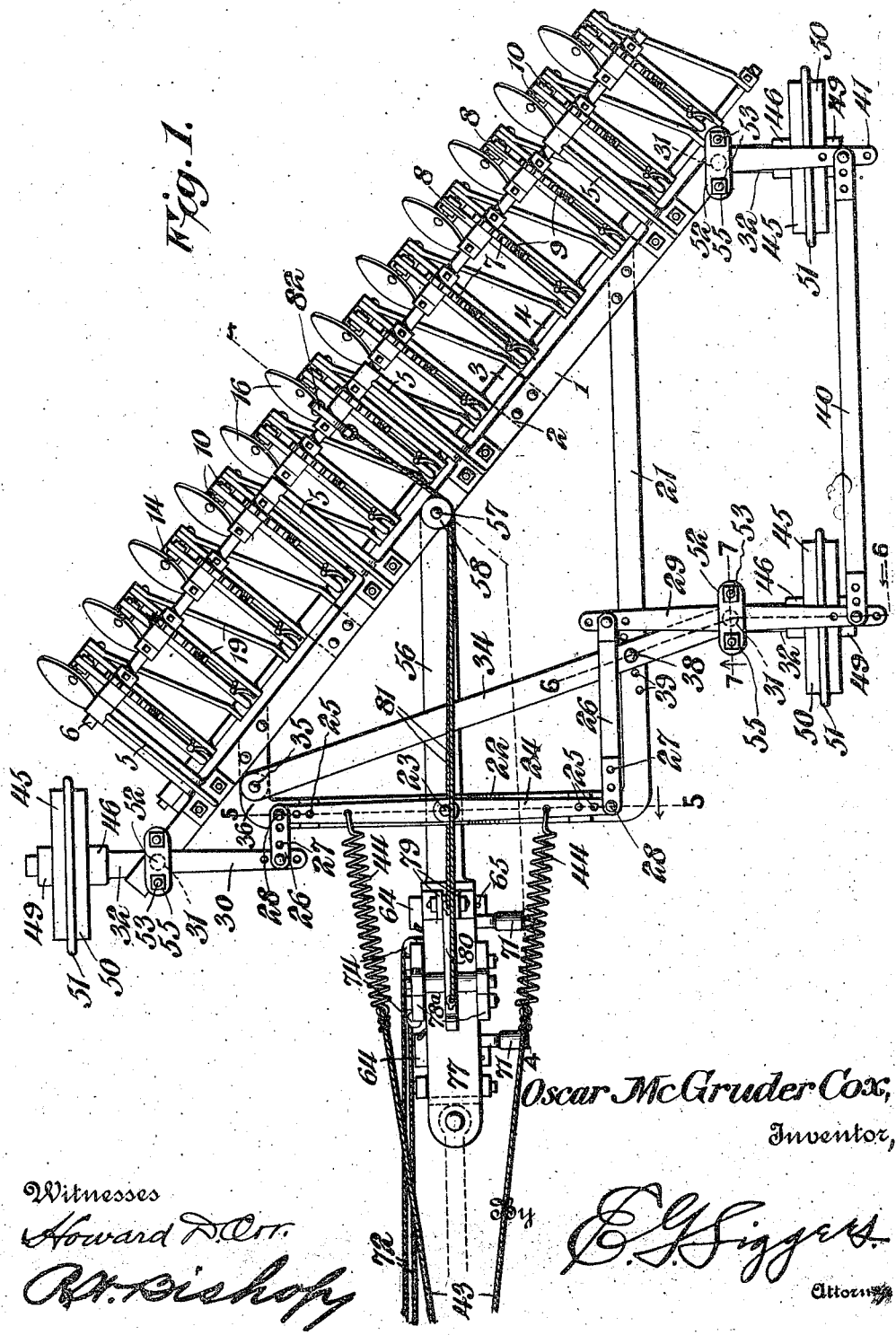

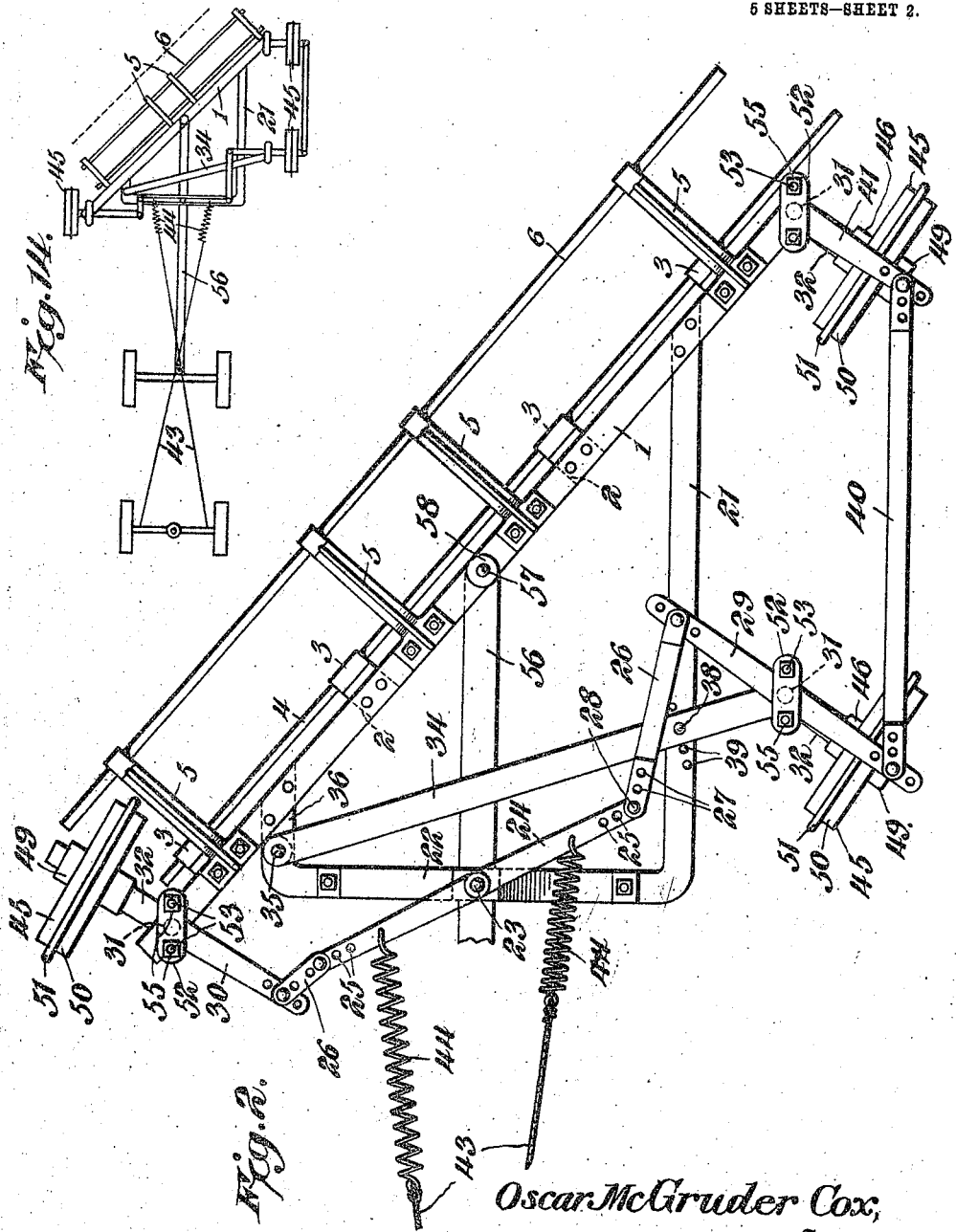

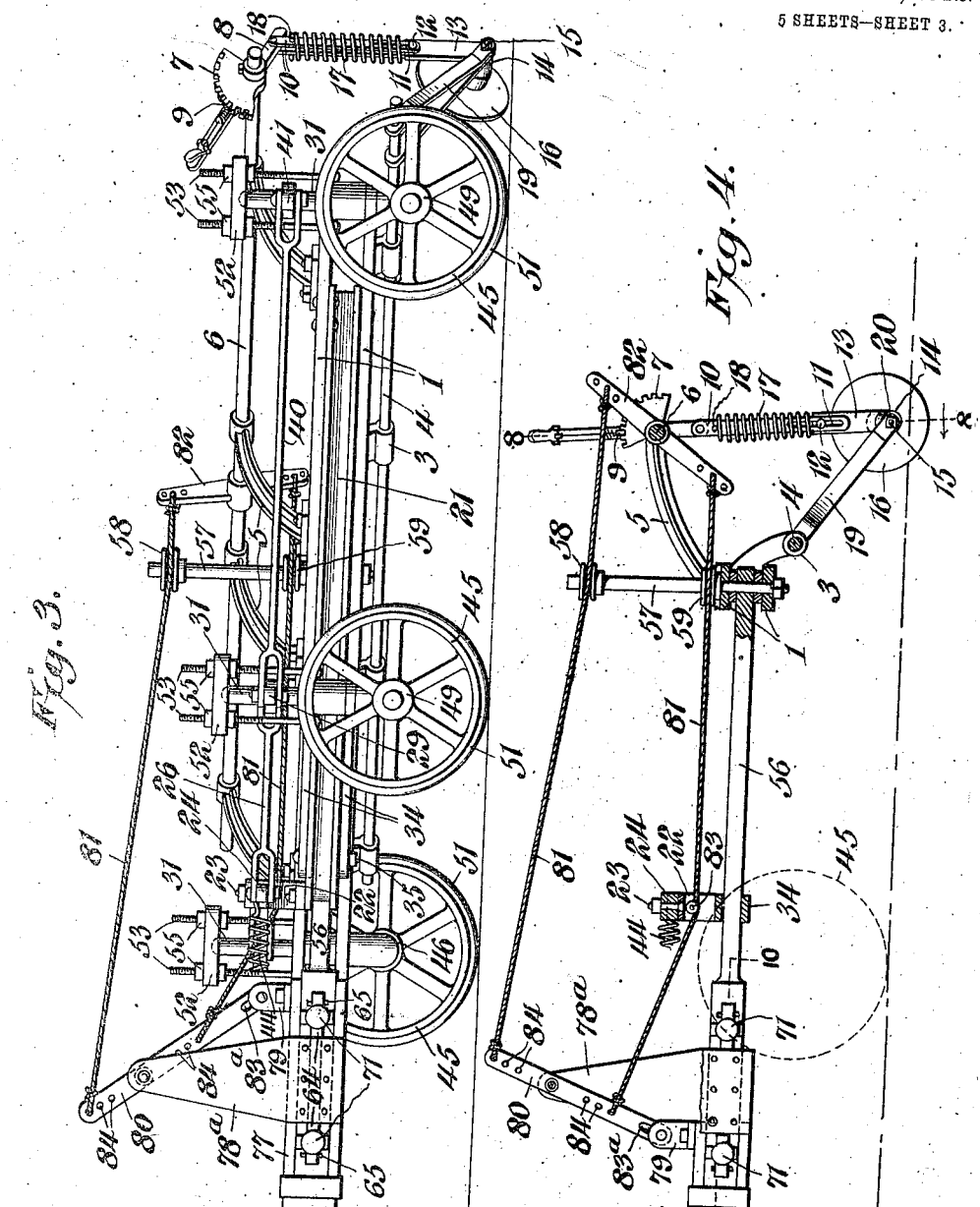

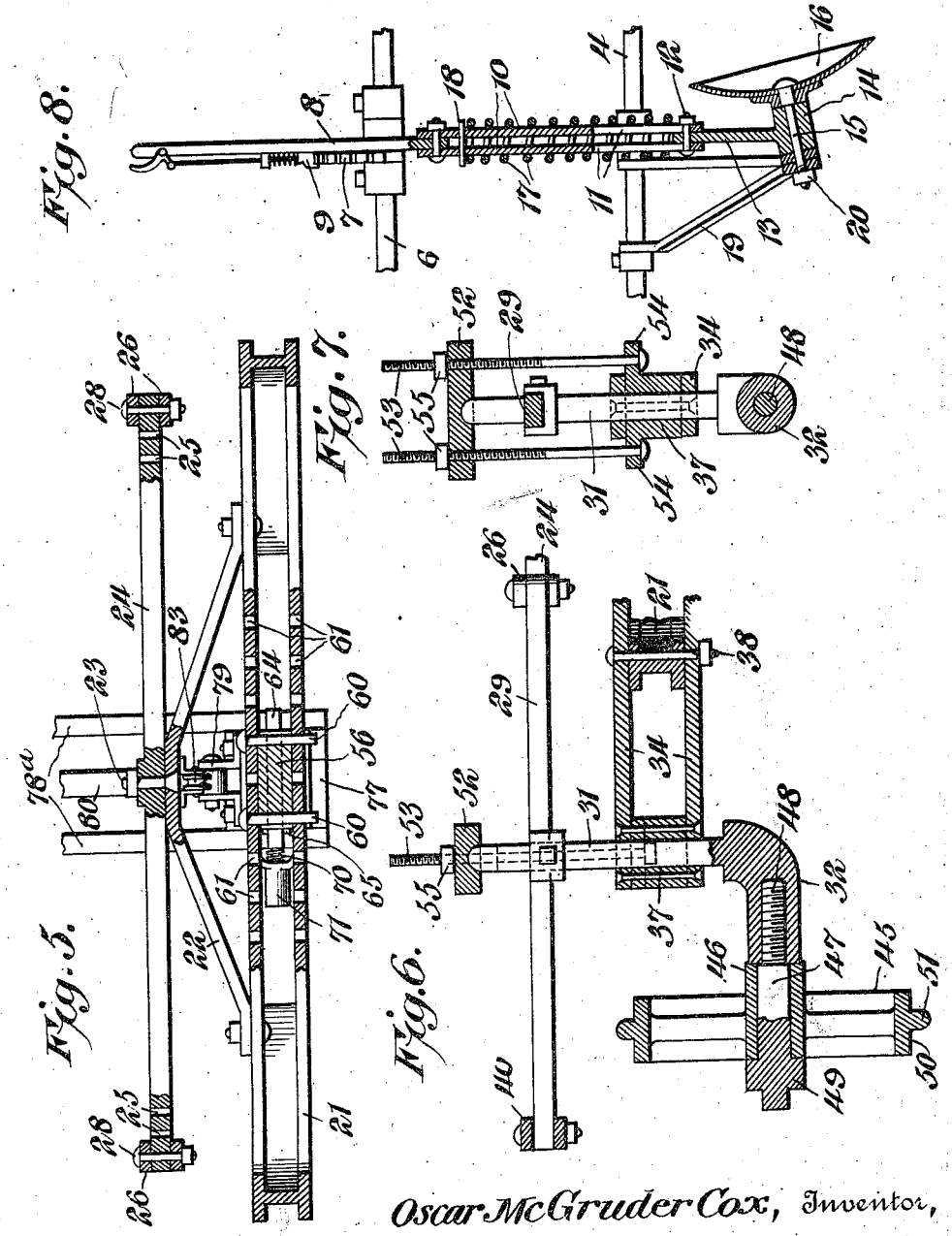

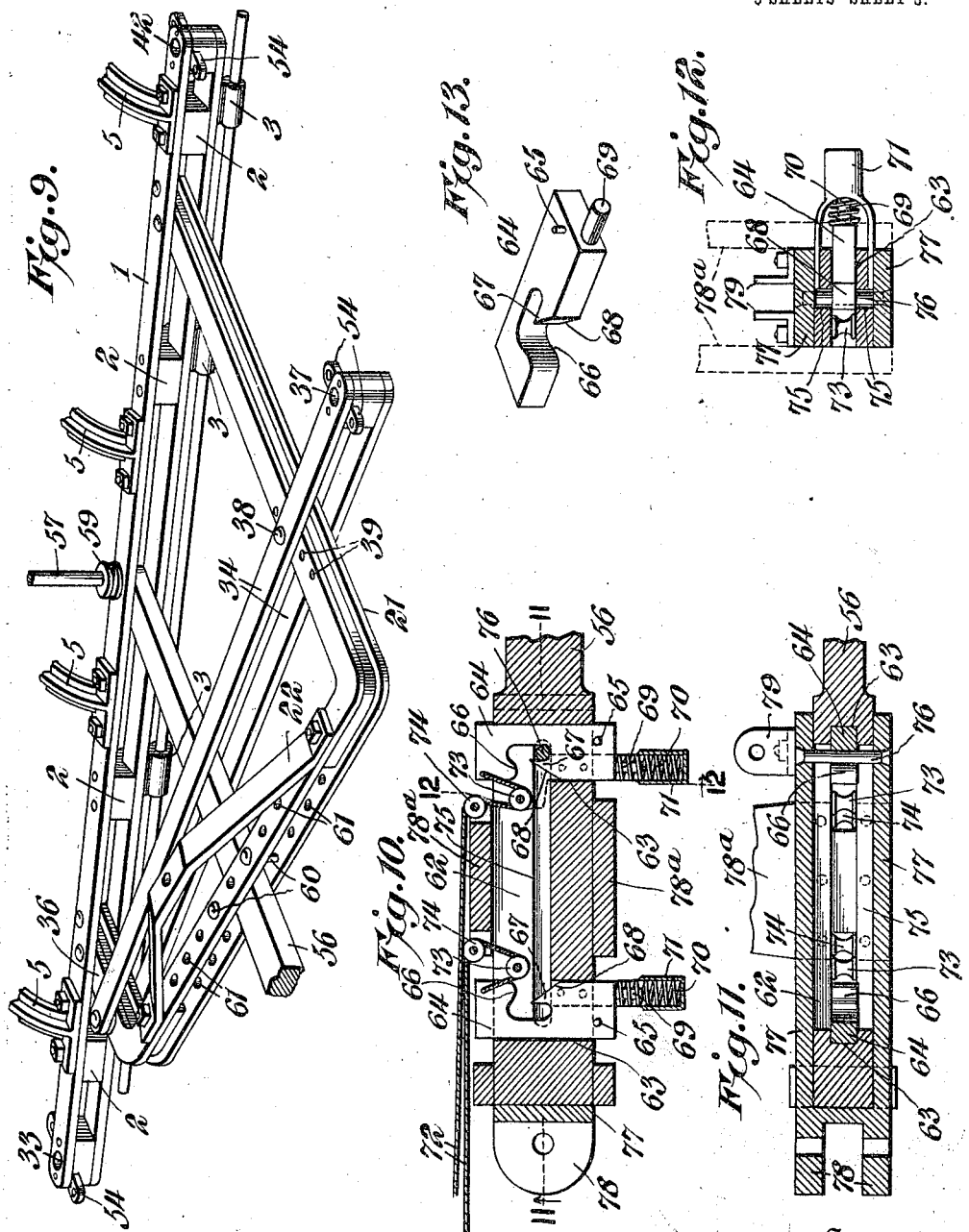

OSCAR McGRUDER COX, OF PLAINVIEW, TEXAS.

DISK PLOW.

1,015,544.

Specification of Letters Patent. Patented Jan. 23, 1912.

Application filed May 4, 1910. Serial No. 559,278.

*To all whom it may concern:*

Be it known that I, OSCAR McGRUDER COX, citizen of the United States, residing at Plainview, in the county of Hale and State of Texas, have invented a new and useful Disk Plow, of which the following is a specification.

My invention relates to disk plows and has special reference to that class of agricultural machinery in which a gang of plows or cultivators is arranged diagonally with respect to the line of travel and drawn over a field by means of a traction engine.

My invention has for its object the provisions of means whereby the steering or carrying wheels may be actuated from and by the traction engine to positively guide the plow and cause the same to follow directly behind the engine.

A further object of the invention is to provide means whereby the gang of plows may be arranged at varying angles to the line of travel and also to provide means whereby the frame may be kept level under various loads.

These objects, and such other incidental objects as will hereinafter appear, are attained by the use of the mechanism illustrated in the accompanying drawings, and the invention consists in certain novel features of the same which will be hereinafter first fully described and then more specifically pointed out in the appended claims.

In the drawings:—Figure 1 is a plan view of my improved disk plow, the traction engine being omitted. Fig. 2 is a similar view of the main supporting frame, showing the carrying and guiding wheels arranged at a different angle as though the machine was turning a corner. Fig. 3 is a side elevation of the improved machine showing the end disk or plow and omitting the other disks of the gang for the purpose of avoiding confusion in the illustration. Fig. 4 is a detail sectional elevation taken on the line 4—4 of Fig. 1. Fig. 5 is a detail sectional view on the line 5—5 of Fig. 1. Fig. 6 is a detail sectional view on the line 6—6 of Fig. 1. Fig. 7 is a detail sectional view on the line 7—7 of Fig. 1. Fig. 8 is a detail section taken on the line 8—8 of Fig. 4. Fig. 9 is a perspective view of the frame detached. Fig. 10 is a detail horizontal section taken on the line 10—10 of Fig. 4. Fig. 11 is a longitudinal section taken on the line 11—11 of Fig. 10. Fig. 12 is a detail section taken on the line 12—12 of Fig. 10. Fig. 13 is a detail perspective view of one of the latches for holding the gang of plows in its adjusted position. Fig. 14 is a diagrammatic view showing the machine connected with a traction engine.

In carrying out my invention, I employ a diagonal beam 1 that is, it is normally at an angle to the line of draft, said beam consisting of upper and lower members which are held in their proper spaced relation by spacing blocks 2 and are rigidly secure together by bolts or rivets of any convenient form. The members of this beam will be preferably constructed of metallic bars and all parts of the frame, wherever it is possible, will be constructed of metal in order to obtain the requisite strength without undue weight. Projecting rearwardly and downwardly from the beam 1 in the ordinary working position of the structure, are a series of brackets or bearings 3 in which is secured a rod 4, as shown. To the upper side of the beam 1, I secure a series of standards 5 which are curved rearwardly, as shown most clearly in Fig. 4, and in the outer upper ends of these standards I journal a rock shaft 6 upon which I provide a number of segmental racks 7, which may be formed integral with the rock shaft or secured rigidly thereto, as will be readily understood. Adjacent each one of the segmental racks 7, I mount loosely upon the rock shaft a lever 8 which carries a spring-controlled latch 9 adapted to engage the rack 7 and thereby lock the lever to the rack so that a movement of the rock shaft will be transmitted to the lever and as will presently appear to a plow connected therewith. To the rear end of each lever 8, there is pivoted the upper ends of links 10 which are provided near their lower ends with longitudinal slots 11 to receive a bolt 12 carried by the upper end of a standard or shank 13, the lower end of the said standard being formed into a hub 14 through which is inserted the bolt 15 by which a disk plow 16 is secured in place. A spring 17 is coiled around the links 10 between the bolt 12 and a pin 18 inserted through the links near the upper ends thereof, and this spring serves to hold the plow disk to its work, while at the same time permitting it to yield to large stones or other obstructions which may be met in the travel of the machine. Forks or braces 19 are hung loosely on the rod or shaft 4 and extend downward and rearward therefrom to engage the bolt 15, and a nut 20 is applied to the end of the said bolt remote from the disk 16 so as to bind the ends of the braces or forks 19 and the disk 16 firmly against opposite ends of the hub or sleeve 14, as shown clearly in Fig. 8, whereby the disk will be firmly secured to and carried by the shank 13 and the links 11. It will be readily seen that by adjusting the lever 8 so as to engage the latch 9 in the rack 7 at any desired point of the same, the individual cultivator disks may be set to cut to any desired depth, and the machine thus regulated according to the nature of the ground to be treated or to compensate for wearing of the disks. Some of the disks may be in the same manner raised entirely from the ground, while others may be permitted to act thereon so that the furrows may be made of any desired width or at any desired distance apart.

Secured to the beam 1 and extending forwardly therefrom is an U-shaped frame 21, the front portion of which is usually at substantially right angles to the line of draft or travel of the machine. The frame 21 is shown as a beam of I-form in cross section with the web cut away throughout a portion of the length of the front part of this frame for a purpose which will presently appear, and secured to the top flange of the beam and of sufficient length to extend to each side of the cut away portion of the web is a truss or arch 22, which serves to stiffen the frame 21 where the web is omitted, and centrally in this arch there is secured a king bolt or pivot 23 serving as a pivot for a lever 24, which latter is provided with a longitudinal series of passages or perforations 25 at each end. To the ends of this lever, I pivotally attach links 26 which are also provided with longitudinal series of openings 27, the pivot pins 28 which connect the links with the draft tree being inserted through alined openings or perforations, as will be readily understood. The ends of the links 26 are forked, as shown most clearly in Fig. 3, so as to more firmly engage the ends of the lever 24, and the ends of the links distant from the lever 24 are pivotally attached to the inner ends of levers 29 and 30 which are rigidly secured to standards 31 having their lower ends 32 turned outward and provided with threaded sockets, as will be readily understood on reference to Fig. 6. One of these standards 31 is journaled in a suitable bearing 33 provided therefor at the end of the beam 1, while the other standard 31 is journaled in the end of a movable beam 34 pivoted, at 35, to the shorter side 36 of the U-shaped frame 21 and extending across the said frame and provided at its free end with a bearing 37 to receive the other standard 31, as will be understood. This vibratory beam 34 carries a pin 38 which is adapted to engage any one of a series of openings 39 formed in the longer side of the frame 21 and describing an arc having the pivot of the said beam 34 as its center.

The lever 29 which is secured to the standard 31 at the front of the machine and on the longer side thereof extends outwardly beyond the lever, and to its outer end is pivotally attached the front end of a connecting bar 40 which extends rearwardly and is pivotally attached to a lever 41 similar to the lever 30 and having its inner end rigidly secured to a third standard 31 journaled in a bearing 42 provided therefor in the end of the beam 1. This arrangement of levers, links, and connecting bar, it will be seen at once, causes simultaneous movement of all the standards when motion is imparted to any one of the same or to the lever 24 which is connected with the traction engine by means of cables 43 extending forwardly from said lever and having their front ends crossed and attached to the front axle of the engine, as indicated in Fig. 14. The rear ends of these cables are connected to the main lever 24, at opposite sides of the pivot thereof, by springs 44 constituting yieldable or elastic connections between the cables and the lever whereby the cables will be kept taut at all times notwithstanding any vibration from the engine or the pull due to irregularities in the surface of the ground. The supporting and guiding wheels 45 are provided with central hubs 46 through which spindles 47 are inserted; the said spindles being provided with threaded inner ends 48 adapted to engage the sockets in the lower ends 32 of the standards 31. The hub 46 has flat or square ends, one of which is adapted to bear squarely against the extremity of the standard 31, while the other end of the hub bears against a collar or annular flange 49 on the spindle 47 whereby extended surfaces are provided to receive the thrust of the wheel due to its travel through the ground and, consequently, the life of the wheels is prolonged and the steadiness of the machine increased. The wheels are provided with wide treads 50 and have annular ribs 51 at the centers of the said treads which are adapted to take into the ground and thereby guide the plow in its travel.

When the wheels 45 are arranged, as shown in Fig. 1, with their ribs 51 parallel with the sides of the frame 21, the plow will be caused to travel directly behind the traction engine in a straight line. Should the end of the field be reached or it be desired to turn a corner for any other reason, the engine is steered in the usual manner so as to make the turn, and the turning of the steering axle will exert a pull upon one of the cables 43 which will be transmitted to the lever 24 so as to vibrate the said lever upon the king bolt 23, and this vibration of the draft tree will be transmitted through the several levers and connecting bar to all the standards 31 so as to turn the same in their respective bearings and bring the carrying wheels into a position at an angle to the longitudinal line of the frame 21, as shown in Fig. 2, whereupon the ribs 51 will cause the machine to follow the path of the traction engine by reason of their engagement with the ground below the surface of the same.

The several standards 31 have their upper ends seated in cross bars 52 through the ends of which pass elongated bolts 53 which are engaged in lugs 54 at the ends of the beams 1 and 34. Nuts 55 are mounted upon the elongated bolts 53 above the cross bar 52 and bear against the same so as to clamp the same to the standards 31 and the beams. It will thus be seen that I have provided simple and efficient means for adjusting the height of the machine or the depth to which the carrying wheels may take into the ground. Should it be desired to have the supporting frame at a greater or less distance from the ground, the nuts 55 are adjusted upon the bolts 53 so as to force the cross bars 52 toward the beams below the same or permit them to be pushed upward from the beams by reason of the standards 31 sliding upward through the beams when the weight of the machine is placed thereon. By adjusting the standards to different degrees, the frame may be brought into a perfectly level position.

It sometimes happens that the draft upon the plows will increase or diminish and the front end of the frame assumes a higher or lower position than the one for which the machine has been adjusted. The vibratory beam 34 enables me to overcome this trouble and restore the frame to a level condition. By moving the free end of the lever to the rear, the support furnished by the intermediate steering wheel is shifted rearwardly and, of course, the front end of the frame will then descend. To accomplish this adjustment, the pin 38 is removed and the beam 34 then moved forward or backward upon its pivot 35 to bring the wheel into the proper position, the pin 38 being then again engaged in one of the openings 39. The pivot pins, by which the several links and levers controlling the steering wheels are connected, are then removed and the several parts adjusted, relative to each other, to compensate for the shifting of the intermediate wheel after which the pivot pins are inserted through the alined openings to maintain the wheels in their position parallel with the draw bar, as will be readily understood. The wheels will then turn when the traction engine turns in the manner previously described so that the gang of plows will travel directly back of the traction engine.

A draft bar 56 is pivoted at its rear end, between the members of the beam 1, upon a standard 57 which rises from the said beam and is equipped with pulleys 58 and 59 which will be presently referred to more in detail. The draft bar 56 extends forward between the top and bottom flanges of the frame 21 where the web is omitted and is held against lateral movement in the front end of the said frame by means of pins 60 which are inserted through perforations 61 in the flanges of said frame where the web is omitted to bear against the opposite sides of the draft bar, as shown most clearly in Fig. 5. The perforations 61 permit the said pins 60 to be adjusted so as to hold the draft bar at any desired angle to the frame 21, as will be readily understood. Ordinarily, the draft bar will extend centrally through the frame 21 so that the gang of plows will assume the angle shown in Fig. 1 relative to the line of travel. Should it be desired, however, to have the gang of plows assume a different angle, the pins 60 are removed and the draft bar swung upon its pivotal connection with the standard 57 toward one side of the frame and the pins 60 then inserted so as to hold the draft bar in its new position. The carrying and guiding wheels will automatically accommodate themselves to this new position of the gang of plows or of the draft bar as they are held to their position relative to the traction engine by the cables 43. The machine will, therefore, follow directly behind the traction engine.

The draw bar 56 is provided with a chamber 62 in its enlarged front end and with openings 63 in its sides communicating with said chamber. Mounted transversely in the ends of the said chamber, and projecting through the openings in the opposite sides of the draw bar, are latches 64 consisting of slides provided on their upper sides with stops 65 adapted to impinge against the sides of the draw bar to limit the inward movement of the slides and provided in their opposed edges with notches or recesses 66 and hooks 67 projecting in said recesses, the said hooks having beveled outer sides 68. Adjacent the stop 65, a pin 69 projects longitudinally from the end of the sliding latch and around this pin is coiled a spring 70 which bears against the end of the latch and also against the end of a housing 71 projecting from the side of the draw bar. At the end of the latch opposite the pin 69 and stop 65, I secure the end of a cable 72 which passes around a pulley 73 within the chamber 62, and also around a pulley 74, on the side of the draw bar, and then extends forward to the cab of the traction engine where it may be connected to a lever or otherwise disposed to be conveniently operated by the engineer. A longitudinal slot 75 is formed in the top and bottom of the draw bar and through the said slots, and the chamber 62 in the said bar, a locking pin 76 extends vertically. This locking pin is carried by a draw head or coupling 77 slidably mounted on the front end of the draw bar and provided at its front end with perforated lugs or projections 78 adapted to receive a coupling pin whereby the plow may be coupled to the draw bar of a traction engine, the draw bar being indicated in dotted lines in Fig. 1. The draw head or coupling 77 plays between standards 78ª, erected on the draw bar at the sides of the same, and is provided on its upper side with brackets 79 between which I pivot the lower end of a lever 80 which is fulcrumed at an intermediate point of its length between the upper ends of the standards 78ª, as shown in Figs. 3 and 4. Cables 81 are attached to the said lever 80, at opposite sides of its fulcrum, and extend rearward from the lever to pass around the pulleys 58 and 59, the rear ends of the cables being secured to the opposite ends of a double crank arm 82 secured rigidly to the rock shaft 6 at the center of the same. The lower cable 81 passes under the truss or arch 22 and is guided by a roller 83 on the under side of the same. The standard 57 on which the pulleys 58 and 59 are mounted is disposed at the center of the beam 1 and consequently serves to keep the cables 81 in line with and directly over the draw bar.

It is believed the operation of the various parts of the machine will be readily understood from the foregoing description, taken in connection with the accompanying drawings. The traction engine is coupled to the draw head or coupling 77, as stated, and, if the plows are to be permitted to take into the ground, the cable 72 attached to the rear latch 64 is drawn upon by the engineer, thereby causing the said latch to slide transversely of the draw bar against the pressure of the spring 70 acting thereon, and, consequently, withdrawing the hook 67 from its engagement with the pin 76. The forward movement of the traction engine will then pull upon the coupling or draw head 77 so as to cause the same to move forward over the draw bar, and the pin 76 will, of course, move forward through the slots 75. As the pin 76 approaches the front ends of the slots 75 it will strike the beveled end 68 of the front latch 64 and will thereby cause the said latch to move transversely of the draw bar to carry the hook 67 out of the path of the pin 76. As soon as the pin has cleared the hook and entered the recess 66, the spring 70 will at once return the slide to its normal position, whereupon the pin 76 will be engaged by the hook of the slide and the coupling or draw head locked to the draw bar. The engineer will then, of course, release the hold on the cable attached to the rear slide. When the coupling or draw head moves forward, the lugs or bearings 79 will, of course, move forward and vibrate the lever 80 upon its fulcrum, and the vibration of the said lever will be transmitted through the cables 81 to the lever 82 so that the rock shaft 6 will be turned to carry the disks or plow blades into the ground. The lower end of the lever 80 is slotted, as indicated at 83ª, to accommodate the forward horizontal movement of the pivot pin connecting the same to the lugs 79, and a plurality of perforations or openings 84 are provided in each of the levers 80 and 82 so that the cables 81 may be attached at different points, and the throw of the rock shaft consequently varied, as may be desired. When it is desired to raise the gangs of plows so as to permit the machine to travel from one field to another or to a barn, the cable attached to the front slide 64 is drawn upon by the engineer and the said slide will thereupon be released from the pin 76 which is carried by the draw head. The engine is then backed sufficiently to move the coupling or draw head rearward upon the draw bar and cause the said locking pin to be engaged by the rear slide or latch 64. The rearward movement of the draw head or coupling will, of course, be transmitted directly to the lever 80 so that the lower end of the same will be swung forward and the lever 82, consequently, given a similar movement so as to rotate the rock shaft 6 and raise the disks or blades from the ground.

While the plows are raised, the engine may be backed so as to bring the gang of disks close to a fence or to the side of the field so that the return trip of the machine across the field will not leave a part of the ground unturned. The plows having been thus brought into position at the side of the field, the engineer pulls upon the cable 72 attached to the rear slide so that the locking pin 76 may move forward when the engine starts. After the engine starts, the cable is released and the locking pin then moves to the front latch and is automatically engaged by it, the result being that the plows are first lowered to the ground and then drawn forward through the same.

My improved plow will travel directly in the path taken by the traction engine and may be utilized for forming furrows of any desired number or distance apart. The several parts of the machine are simple in their construction and are compactly arranged so that there is no excessive weight to be drawn by the engine and, consequently, there is no unavoidable expense attendant upon the use of the machine. The plows are controlled from the cab of the engine and may be operated readily therefrom to be brought to any desired adjustment.

The advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

It will be noted that each wheel 45 has a central peripheral cutter flange or rib which is intended to hold against all side pressure produced by the plows when at work.

Having thus described my invention, what I claim is:—

1. The combination with a supporting frame provided with a diagonally arranged beam and plows carried thereby, of a lever mounted on the frame and arranged to be coupled to a traction engine, a supporting wheel at one end of the diagonal frame and provided with a carrying standard pivotally mounted on the same end of the diagonal beam, a second supporting wheel provided with a carrying standard pivotally mounted on the other end of the beam, the wheels projecting from relatively opposite sides of the beam, a third supporting wheel intermediate of the first named wheels and on the same side of the frame as the second wheel, said third wheel having a carrying standard pivotally mounted on the frame, a lever fast to each standard, a connecting bar between the corresponding ends of the levers of the second and third wheels, the lever of the third wheel extending beyond the standard on the side thereof remote from the portion of the lever connected to the lever of the second wheel, and link connections between the lever mounted on the frame and the levers connected to the standards of the first and third named wheels, the link connection to the lever of the third wheel being to that portion of the lever remote from the portion connected to the lever of the second wheel.

2. The combination with a supporting frame provided with a diagonally arranged beam and plows carried thereby, of a lever mounted on the frame and arranged to be coupled to a traction engine, a supporting wheel at one end of the diagonal frame and provided with a carrying standard pivotally mounted on the same end of the diagonal beam, a second supporting wheel provided with a carrying standard pivotally mounted on the other end of the beam, the wheels projecting from relatively opposite sides of the beam, a third supporting wheel intermediate of the first named wheels and on the same side of the frame as the second wheel, said third wheel having a carrying standard pivotally mounted on the frame, a lever fast to each standard, a connecting bar between the corresponding ends of the levers of the second and third wheels, the lever of the third wheel extending beyond the standard on the side thereof remote from the portion of the lever connected to the lever of the second wheel, and link connections between the lever mounted on the frame and the levers connected to the standards of the first and third named wheels, the link connection to the lever of the third wheel being to that portion of the lever remote from the portion connected to the lever of the second wheel, the mounting for the third wheel together with its standard and lever comprising a movable beam pivotally connected at the end remote from the wheel to the frame and provided with means for holding it in adjusted positions about its pivotal connection with relation to the supporting frame.

3. The combination of a supporting frame, a lever pivotally mounted thereon and provided with a series of perforations at its ends, a plurality of standards mounted in the supporting frame, and carrying guiding wheels, levers secured to the said standards and provided with series of perforations in their ends, links provided with series of perforations in their ends, and pivot pins inserted through alined perforations in the ends of the links and in the ends of the several levers.

4. The combination of a supporting frame, a gang of plows mounted thereon, a draw bar pivotally secured to the rear side of the frame and projecting through the front side thereof, retaining devices adjustably mounted in the front side of the supporting frame and bearing against opposite sides of the draw bar, a vibratory beam pivoted at one end to one side of the frame and projecting beyond the opposite side thereof, means for securing the said beam at various points of the said opposite side of the frame, standards mounted in the end of the said vibratory beam and in the ends of the rear beam of the supporting frame, guiding wheels carried by the said standards, and connections between the said several standards to simultaneously rotate the same.

5. The combination of a supporting frame, a gang of plows carried thereby and mounted diagonally upon the same, and supporting and guiding wheels at each side of the frame, said wheels being carried by the lower end of a standard, and said standard being passed through an opening of the frame and thereby rotatably mounted and free to move vertically, a cross bar seated in the upper end of each standard and constituting a thrust bearing for the wheel standard, bolts secured to the supporting frame on opposite sides of each standard and passed through each cross bar, and nuts on the ends of the bolts.

6. The combination of a supporting frame having a front transverse beam provided with spaced flanges, in each of which is a series of openings matching those of the other flange, a lever carried by the front transverse beam, a gang of plows mounted upon said frame, supporting wheels for the frame pivotally connected thereto and also connected to the lever for simultaneous movement in the same direction, said lever being adapted to be connected to a traction engine, a draw bar pivoted at its rear end to the rear portion of the frame and projecting between the flanges of the front transverse beam and beyond the front end of the frame and adapted to be there connected to the traction engine, and retaining pins adapted to the openings in the front transverse beam to bear simultaneously against opposite sides of the draw bar for adjusting the latter to different angular relations to the supporting frame, the lever and wheels controlled thereby automatically conforming to the changed relation of the traction engine and frame due to changes in the angular relation of the draw bar and frame.

7. The combination of a frame, a gang of plows mounted at the rear end of the frame, a beam pivoted to one side of the frame and projecting beyond the opposite side of the frame, a standard mounted in the free end of the beam, and carrying a guiding wheel, standards mounted at opposite sides of the frame and also carrying guiding wheels, adjustable connections between the several standards, and means for retaining the pivoted beam in its adjusted position.

8. The combination of a substantially triangular frame, supporting wheels mounted at the front and rear corners of the frame at opposite sides of the frame, an intermediate supporting wheel connected with the frame in advance of the wheel at the rear corner of the same, a pivoted carrier for the intermediate wheel for shifting it longitudinally of the frame, and adjustable connections between the several wheels.

9. The combination of a supporting frame and a gang of plows mounted diagonally upon the same, supporting and guiding wheels at each end of the gang of plows, a third supporting and guiding wheel arranged in line and in advance of the rearmost wheel, pivot supports for the wheels about the axes of which the wheels may swing in horizontal planes, a lever and link system connecting the pivot supports of the wheels together for movement in unison all in the same direction, means for connecting the link and lever system to the steering mechanism of a traction engine, and means for connecting the supporting frame with the draft devices of the traction engine, the connection between the traction engine and the supporting frame having an extent of free movement.

10. The combination of a supporting frame and a diagonally disposed beam mounted thereon and carrying a gang of plows, bearings at the ends of the beam, standards mounted in the bearings, supporting and guiding wheels carried by the standards, a third standard carrying a guiding and supporting wheel and mounted on the supporting frame in advance of and in line with the rear standard and wheel, link and lever connections between the front standard and third standard, and lever and link connections between the rear standard and the third standard, the last named link and lever connections being on the same side of the respective standards, all said link and lever connections operating in unison to move all the standards simultaneously in the same direction.

11. The combination with the supporting frame, and a diagonally arranged gang of plows, a series of guiding and supporting wheels for the frame and plows, a movable beam connected to the frame and shiftable back and forth on the frame in a horizontal position, and connections between said beam and one of said wheels for shifting the said wheel longitudinally of the frame.

12. The combination with the supporting frame, and a diagonally arranged gang of plows, a lever mounted at the front of the frame, guiding and supporting wheels mounted at the opposite ends of the gang of plows, a third guiding and supporting wheel arranged in advance of and in line with and at the same side as the rearmost wheel, standards to which said wheels are connected, means for journaling said standards, a lever connected to each standard, and link connections between the levers of the standards and the lever mounted at the front of the frame, whereby the shifting of said lever affects the turning of the several standards in unison in the same direction and the consequent turning of the wheels.

In testimony, that I claim the foregoing as my own, I have hereto affixed my signature in the presence of two witnesses.

OSCAR McGRUDER COX.

Witnesses:
 JOHN H. SIGGERS,
 W. L. COX.